Aug. 12, 1941.                R. AMUNDSON, JR                   2,252,056
                        ROTARY REFLECTOR FOR VEHICLES
                             Filed Aug. 4, 1939
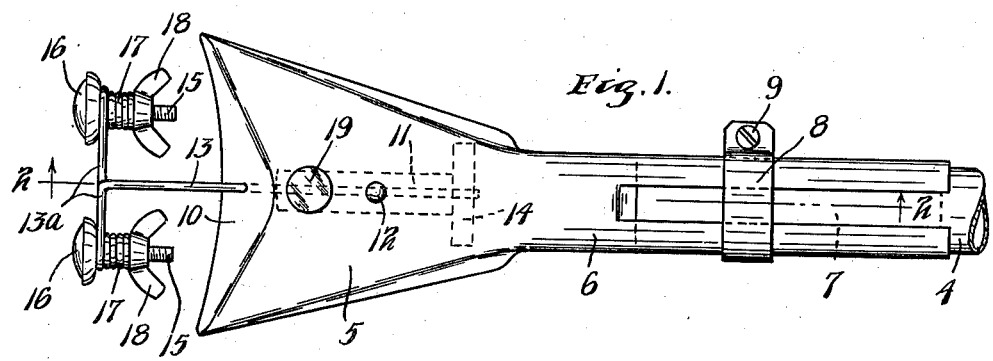
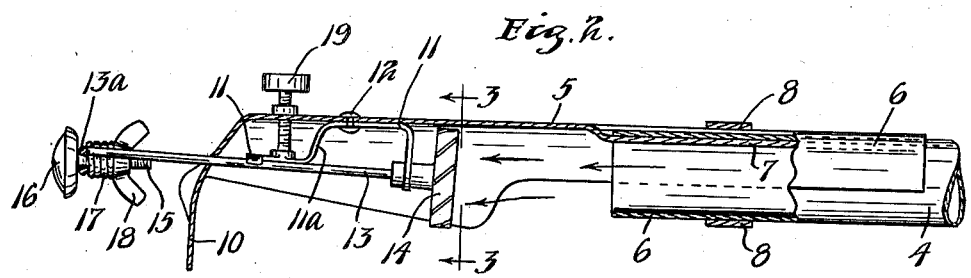
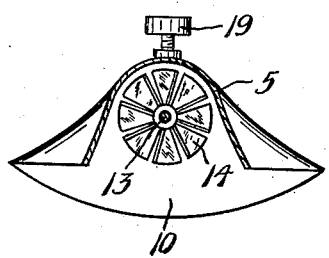
INVENTOR.
REINERT AMUNDSON JR.
BY HIS ATTORNEYS.
Williamson & Williamson Patented Aug. 12, 1941

2,252,056

UNITED STATES PATENT OFFICE 2,252,056

ROTARY REFLECTOR FOR VEHICLES

Reinert Amundson, Jr., Minneapolis, Minn.

Application August 4, 1939, Serial No. 288,256

7 Claims. (Cl. 88—81)

This invention relates to motor vehicle attachments and more particularly to devices for movably supporting ornamental reflector elements on such vehicles.

One of the objects of the invention is to provide a movable ornamental device which is actuated by the exhaust flow of gases from the internal combustion engine of the vehicle.

Another object of the invention is to provide a movable device for supporting reflecting elements so that they will be more prominently displayed.

A further object of the invention is to provide a rotary reflector mounting in combination with the exhaust conduit of a motor vehicle wherein the reflector is actuated by the exhaust gases and wherein the natural outflow of gases is not retarded.

Still another object of the invention is to effectively shield the ornamental reflector elements from contact with the carbon laden motor vehicle exhaust gases so that they will not become covered with a grease and carbon film.

Still a further object of the invention is to provide a rotary reflector support for motor vehicles wherein rotation of the support can be retarded at will.

These and other objects and advantages of the invention will more fully appear from the following description made in connection with the accompanying drawing, wherein like reference characters refer to the same parts throughout the views, and, in which:

Fig. 1 is a plan view of my invention associated with a motor vehicle exhaust deflector mounted on the end of a motor vehicle exhaust pipe;

Fig. 2 is a section taken approximately on the line 2—2 of Fig. 1; and

Fig. 3 is a vertical section taken approximately on the line 3—3 of Fig. 2.

A motor vehicle exhaust pipe is indicated at 4, only the outlet end of the pipe being shown and the remainder being broken away. It is, of course, understood that this pipe extends rearwardly from the customary muffler to which exhaust gases are first conducted after leaving the exhaust ports of a motor vehicle engine. Mounted upon the rear or discharge end of the exhaust pipe 4 is a deflector comprising a body 5 which is connected to the exhaust pipe by means of a forward extension 6 which is substantially of inverted U-shape. The extension 6 has a tongue 7 formed therein and, as seen in Figs. 1 and 2, this tongue is extended into the pipe with the remainder of the U-shaped portion 6 overlying the pipe. The length of the tongue 7 determines the distance which the element 6 can be pushed up into or along the end of the exhaust pipe. A suitable split clamp 8 tightened by a bolt 9 firmly secures the element 6 on the pipe.

The deflector body 5 has a rearwardly positioned downwardly extending apron 10. Thus it is seen that exhaust gases issuing from the pipe 4 are directed rearwardly beneath the upper portion of the body 5 and against the downwardly curved apron 10 so that said gases are deflected toward the ground rather than against any rear body portion or the bumper of the vehicle.

A bracket 11 is secured to the upper under side of the body 5 as by a rivet 12. The bracket 11 extends forwardly and thence downwardly to provide a supporting bearing for a substantially horizontally disposed rotary shaft 13. The extreme forward end of the shaft carries a rotary propeller or fluid motor 14. Shaft 13 extends rearwardly through the apron 10 of the deflector element and a short distance on the rearward and outer side of said apron 10. The outer or rear end of the shaft 13 is provided with a T head in the form of arms 13a which preferably lie at right-angles to the main shaft. On the ends of the arms 13a are bolts 15 which preferably extend through the ends of the arms 13a which may be conveniently looped to receive said bolts. The left-hand ends of the bolts 15, as viewed in Fig. 2, carry glass or other suitable reflector buttons 16. The right-hand portions of the bolts 15 may be provided with springs 17 against which are turned thumb nuts 18 which clamp the screws and reflector buttons to the T head. It is greatly preferred that the arms 13a which carry the reflector buttons be of a length less than the distance from the shaft 13 to the bottom of the deflector apron 10. Thus the gases issuing from the exhaust pipe are deflected downwardly and cannot come into contact with the reflector elements.

The bracket 11 which supports one end of the shaft 13 has a rearwardly extending portion 11a which is bent downwardly then rearwardly and is preferably provided with a brake shoe 11b which is of inverted U-shape and is adapted to relatively snugly fit over a portion of the shaft 13. A threaded bolt 19 is provided with a knurled head as shown and said bolt extends downwardly through the upper portion of the deflector body 5 and is adapted to bear against a portion of the rearwardly extending bracket 11a. The bracket portion 11a is of resilient metal so that when the bolt 19 is turned to move it away from the shaft 13, the brake element 11 will be lifted away from the shaft so that there will be no drag thereupon. This brake mechanism is provided to prevent the reflector element on the T head of the shaft 13 from rotating more rapidly than is desired.

It will be noted in Figs. 2 and 3 that the rotary propeller unit 14 is positioned approximately at the end of the U-shaped forward extension 6 of the gas deflector so that a considerable proportion of the gases issuing from the exhaust pipe 4 will be directed against said propeller. It will be further noted, however, that the propeller 14 is spaced a substantial distance from the outlet end of the exhaust pipe 4 and that the end of the pipe is relatively unobstructed so that there is absolutely no possibility of backing up exhaust gases in said pipe. If there is any appreciable amount of resistance to the natural outflow of exhaust gases, there is a possibility that occupants of the vehicle might be subjected to such gases in the body of said vehicle due to leakage at various joints in the motor vehicle exhaust system. Furthermore, as above stated the tongue 7 which extends into the exhaust pipe from the U-shaped portion 6 of the exhaust deflector positively prevents the deflector from being pushed upon the pipe beyond a certain maximum so that the propeller 14 cannot be positioned immediately adjacent the open end of the exhaust pipe.

From the foregoing description it will be seen that I have provided a simply constructed yet efficient and ornamental accessory for motor vehicles whose rotary action is brought about by the flow of exhaust gases from the conventional motor vehicle exhaust pipe. The reflector unit is so constructed and arranged relative to the exhaust pipe that it will operate all of the time the motor vehicle engine is in operation, and it is not dependent upon the wind or actual movement of the vehicle itself. The reflector buttons are at all times protected against the carbon and oil laden exhaust gases, and the exhaust gas deflector will function in its normal manner without interference from the rotary reflector unit. It is a device which can be attached to any motor vehicle exhaust pipe merely by slipping it onto the pipe and positioning the clamp 8 or other suitable attachment means.

It will, of course, be understood that various changes may be made in the form, details, arrangement and proportions of the various parts without departing from the scope of my invention.

What is claimed is:

1. The combination with the outlet end of a motor vehicle engine exhaust pipe, of an element secured to the end of the exhaust pipe, a portion of said element extending outwardly from the outlet end of said exhaust pipe, a fluid motor mounted on a rotatable shaft on said element and positioned adjacent to and in substantial alignment with the end of said exhaust pipe, and a rotatable ornamental reflector device supported by said element and connected to said fluid motor for operation thereby.

2. The combination with the outlet end of a motor vehicle engine exhaust pipe, of a deflector body having a downwardly extending portion, means on said body securing the same to the end of the motor vehicle exhaust pipe with said downwardly extending portion crossing the longitudinal axis of said pipe in spaced relation to the end of said pipe, a rotary fluid motor operated by gases from said pipe supported by said body forwardly of its downwardly extending portion, a rotatable shaft drivingly connected to said motor and extending rearwardly through said downwardly extending portion, and an ornamental reflector device mounted on the rear end of said shaft for rotation therewith.

3. The structure in claim 2, and the rear end of said shaft having a T head thereon, and a plurality of ornamental reflector elements mounted on said T head.

4. The structure in claim 2, and the rear end of said shaft having a T head thereon, and the ends of said head having reflector buttons mounted thereon to intercept and reflect light directed thereagainst.

5. An attachment for motor vehicles comprising a deflector body having a downwardly extending portion, means on said body for securing the same to the end of a motor vehicle exhaust pipe, a rotary fluid motor supported by said body forwardly of its downwardly extending portion and in substantial alignment therewith, a rotatable shaft secured to said motor and extending rearwardly through said downwardly extending portion, a T head on the rear end of said shaft, an ornamental reflector device mounted on said T head and the length of the arms of said T head being no greater than the distance from said shaft downwardly to the bottom of said downwardly extending deflector portion.

6. The structure in claim 2 and said deflector body securing means including means for positively limiting the positioning of said fluid motor relative to the end of said exhaust pipe to a predetermined minimum.

7. The combination with the outlet end of a motor vehicle engine exhaust pipe, of an element removably secured on said pipe and extending rearwardly thereof in general alignment therewith, said element having a portion spaced from the end of said exhaust pipe and intersecting the longitudinal axis of the end of said pipe, a fluid motor supported by said element for movement relative thereto and in substantial alignment with the longitudinal axis of said exhaust pipe and spaced from the end of said pipe at a point between said end and that portion of said element intersecting the longitudinal axis of said pipe, visual display means supported by said element for movement relative thereto rearwardly of that portion of said element intersecting the longitudinal axis of said exhaust pipe, said visual display means being connected to said fluid motor for actuation thereby, whereby exhaust gases issuing from the end of said exhaust pipe will act upon said fluid motor to move the same relative to said element secured to said exhaust pipe and also transmit this motion to said movable visual display means.

REINERT AMUNDSON, Jr.